US008156137B2

(12) United States Patent
Aakolk et al.

(10) Patent No.: US 8,156,137 B2
(45) Date of Patent: Apr. 10, 2012

(54) DATA PROCESSING SYSTEMS AND METHODS (75) Inventors: Michael Aakolk, Wiesloch (DE); Wolfgang Koch, Östringen-Odenheim (DE)

(73) Assignee: SAP AG, Walldorf (DE)

( * ) Notice: Subject to any disclaimer, the term of this patent is extended or adjusted under 35 U.S.C. 154(b) by 246 days.

(21) Appl. No.: 11/172,995

(22) Filed: Jul. 5, 2005

(65) Prior Publication Data
US 2006/0184569 A1  Aug. 17, 2006

(30) Foreign Application Priority Data

Feb. 16, 2005 (EP) .................................... 05003260
May 9, 2005 (EP) .................................... 05010081

(51) Int. Cl.
*G06F 7/00* (2006.01)
*G06F 17/30* (2006.01)
*G06F 3/00* (2006.01)
*G06F 9/44* (2006.01)
*G06F 9/46* (2006.01)
*G06F 13/00* (2006.01)

(52) U.S. Cl. ......... 707/769; 717/106; 717/116; 719/320
(58) Field of Classification Search .............. 707/1, 769; 717/116; 719/320
See application file for complete search history.

(56) References Cited

U.S. PATENT DOCUMENTS

| 5,903,721 | A  | * | 5/1999 | Sixtus .......................... 726/2 |
| 6,192,370 | B1 | * | 2/2001 | Primsch ................... 707/103 R |
| 6,611,838 | B1 | * | 8/2003 | Ignat et al. ........................ 1/1 |
| 7,350,191 | B1 | * | 3/2008 | Kompella et al. ......... 717/108 |
| 2003/0028540 | A1 | * | 2/2003 | Lindberg et al. ............. 707/100 |
| 2004/0122826 | A1 | * | 6/2004 | Mackie ...................... 707/100 |
| 2005/0021354 | A1 | * | 1/2005 | Brendle et al. .................... 705/1 |
| 2005/0021563 | A1 | * | 1/2005 | Shaburov .................... 707/104.1 |
| 2005/0022157 | A1 | * | 1/2005 | Brendle et al. ............... 717/104 |
| 2005/0022163 | A1 | * | 1/2005 | Brendle et al. ............... 717/116 |
| 2005/0027697 | A1 | * | 2/2005 | Cheng et al. ...................... 707/3 |
| 2005/0071342 | A1 | * | 3/2005 | Calusinski .................... 707/100 |
| 2005/0091192 | A1 | * | 4/2005 | Probert et al. ...................... 707/1 |
| 2006/0179042 | A1 | * | 8/2006 | Bram et al. ....................... 707/3 |

OTHER PUBLICATIONS

Benataliah et al., "Declarative Composition and Peer-to-Peer Provisioning of Dynamic Web Services," Proceedings of the 18t~International Conference on Data Engineering (ICDE '02), San Jose, California, 2002 (12 pages).*
European Communication and Search Report for EP Patent Application No. 05010081.7, dated Mar. 2, 2007 (4 pages).
Benatallah et al., "Declarative Composition and Peer-to-Peer Provisioning of Dynamic Web Services," *Proceedings of the 18th International Conference on Data Engineering(ICDE '02)*, San Jose, California, 2002 (12 pages).

* cited by examiner

*Primary Examiner* — Pierre Vital
*Assistant Examiner* — Sabana Rahman
(74) *Attorney, Agent, or Firm* — Finnegan, Henderson, Farabow, Garrett & Dunner, LLP (57) ABSTRACT

Data processing system(s) and methods are disclosed. An enterprise services framework interface is provided for receiving a service request from a service consumer for performing a database access and a database for storing transactional data. Further, repository means may be provided for storing data descriptive of business objects and for storing data descriptive of a buffer object, and processor means may be provided for execution of an application program. In addition, a main memory may be provided for storing an instance of the buffer object, wherein the instance of the buffer object contains at least one instance of one of the business objects. Methods for accessing a database and methods for calling an application program are also disclosed.

19 Claims, 5 Drawing Sheets

DATA PROCESSING SYSTEMS AND METHODS

TECHNICAL FIELD

The present invention generally relates to the field of data processing and, more particularly, to the field of enterprise services framework technologies.

BACKGROUND

An enterprise services framework (ESF) provides a service-oriented infrastructure that allows for separating and isolating business logic within application architectures in a manner that allows reuse of the business logic within various situations in a flexible and easy-to-build way. An ESF service-oriented architecture includes clients which consume services provided by a server-side generic class, the service manager.

The services offered by the service manager may be constructed out of elementary pieces. These pieces and the construction principle together form the ESF interface.

The ESF interface may be an interface construction principle, which allows building arbitrary methods out of elementary building blocks.

Further, the ESF may contain an ESF repository. The ESF repository may contain the meta data for the ESF, describing the connection between the business logic implementation and the elements of the virtual programming model.

ESF may also be referred to as Enterprise Services Architecture (ESA). An ESA implementation is available from SAP AG (Walldorf, Germany). ESA features ESI from NetWeaver and many further adaptions from SAP applications (ESI=Enterprise Services Infrastructure which comprises ESF—enterprise services framework (runtime), ESR—enterprise services repository (meta data for business objects and services), and ESP—enterprise services protocol (cross system communication, web services)).

SUMMARY

Consistent with embodiments of the invention, data processing systems may be provided that comprise an enterprise services framework interface for receiving a service request from a service consumer for performing a database access and a database for storing transactional data. The data processing systems may also comprise repository means for storing data descriptive of business objects and for storing data descriptive of a buffer object, processor means for execution of an application program, and a main memory for storing an instance of the buffer object, the instance of the buffer object containing at least one instance of one of the business objects, methods for access to the database, and methods for calling the application program.

Consistent with one embodiment of the invention, a buffer object may provide a set of database access methods, allowing database access operations to be performed in the same way irrespective of the application program that is involved, and facilitating the design of application programs as database access functionalities do not need to be included into the application programs. The performance parameters of database access operations, such as latency times for performing various database access operations, may thus be identical irrespective of the involved application program. This may facilitate the interoperation of various services in an enterprise services framework that may consist of a set of relatively autonomous units and services.

Consistent with another embodiment of the invention, transactional data may be held by an instantiated buffer object in the main memory. For example, an application program may check transactional data for consistency, plausibility, and/or completeness. The application program may signal to the instantiated buffer object when the data check has been successful. In response, the instantiated buffer object may use one of its database access methods to persistently store transactional data into a database.

Consistent with an additional embodiment of the invention, business objects and buffer objects may be stored in one or more service repositories. For example, business objects may be stored in an ESF repository while buffer objects may be stored in a separate repository.

Consistent with another embodiment of the invention, a user interface layer may be provided that contains a user interface pattern. The user interface pattern may be parameterized by the user interface layer in order to generate a window for a user's entry of a service request and/or transactional data.

Consistent with an embodiment of the invention, the buffer object may comprise methods for inserting a newly created instance of one of the business objects, methods for updating a previously created instance of one of the business objects, and methods for deleting a previously created instance of one of the business objects. The buffer object may also comprise methods for selecting a previously created instance of one of the business objects by means of a respective access key, methods for adding a node to a previously created instance of one of the business objects, and methods for saving business object related data being held in the buffer object into a database.

Consistent with yet another embodiment of the invention, the data processing system may comprise a locking component for maintaining data consistency when concurrent database access operations occur. The data processing system may also comprise an instantiated buffer object being adapted to initiate a database update, for example, by means of a database logical unit of work Consistent with still other embodiments of the invention, data processing methods for accessing a database may be provided. The methods may comprise receiving a request from a service consumer for performing a database access operation via an enterprise services framework interface, and instantiating a buffer object, the instantiated buffer object comprising at least one instantiated business object, and methods for access to a database storing transactional data and for calling an application program. The methods for accessing a database may also comprise temporarily storing transactional data related to the request as part of the instantiated buffer object in a main memory, calling the application program by the instantiated buffer object for checking the transactional data, and persistently storing the transactional data in the database if the data check by the application program has been successful.

Embodiments consistent with the invention further relate to computer program products for performing data processing methods for accessing a database.

The present invention can facilitate ESI contract fulfillment regarding buffering and transactional behavior. Further, it can facilitate to build business object implementations for SAP customers and partners. Further, consistent with the invention, a single point of access for many important ESF features may be provided; for example, there may be only one code line to maintain due to meta data driven usage of common parts Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Reference will now be made in detail to embodiment of the invention, examples of which are illustrated in the accompanying drawings. Wherever possible, the same reference numbers will be used throughout the drawings to refer to the same or like parts.

Figure 1:
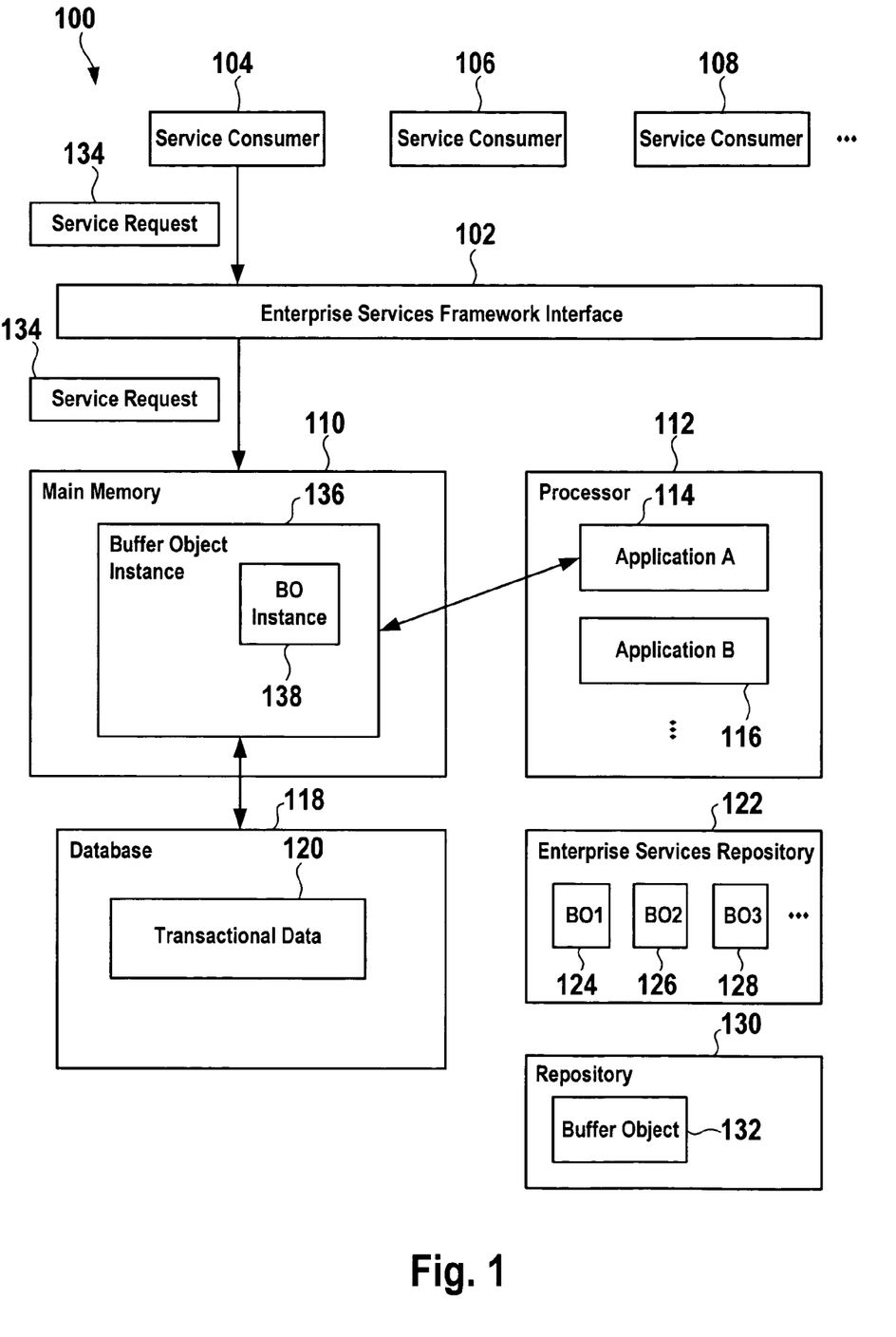
FIG. 1 is a block diagram, consistent with an embodiment of the invention, of an exemplary data processing system.

FIG. 1 illustrates an exemplary data processing system 100 that may implement an enterprise services framework including an enterprise services framework interface 102. Enterprise services framework interface 102 may include two interfaces: a service consumer interface, also called service consumer API or (generic/local) client proxy, and a service provider interface. The first one may be public for all consumers, the later one may also be generic or specific for a respective backend implementation.

The enterprise services framework interface 102 may serve as an interface to a number of service consumers 104, 106, 108, . . . that may use services provided by the enterprise services framework.

As shown in FIG. 1, data processing system 100 may also comprise a volatile main memory 110, a processor 112 for execution of various application programs, such as application program A 114, application program B 116, etc., a database 118 for persistently storing transactional data 120, an enterprise services framework repository 122 for storing a number of business objects BO1 124, BO2 126, BO3 128, etc., and a repository 130 for storing a buffer object 132. Buffer object 132 may carry buffer framework related meta data.

By way of example, there may be two different types of meta data: meta data which may be public to the consumer via ESF repository 122 and meta data that may be private to the service provider, e.g., internals of the buffer steering. Buffer object 132 may only contain the private meta data.

Business objects BO1, BO2, BO3 may describe complete elementary business processes, such as making a purchase order, providing a product cost estimate, invoicing a customer for a service, etc. Encapsulation of the description of a complete business process in such a business object may reduce complexity because the inner structure of the business object remains concealed.

Each of business objects BO1, BO2, and BO3 may carry meta data that may identify one of the application programs A, B.

Buffer object 132 may have a number of methods for performing database access operations. For example, buffer object 132 may include a method 'REFRESH_BY_RELATION'. The method 'REFRESH_BY_RELATION' may be used for adding a node in a respective relation to an instantiated business object. For example, business objects BO1, BO2, BO3 stored in enterprise services framework repository 122 may be described by means of respective entity relationship models that may be composed of nodes and relationships linking the nodes. In this instance, the method 'REFRESH_BY_RELATION' may be used for adding a node and a respective relation to an already instantiated business object.

The method 'INSERT' of buffer object 132 may serve to create a new instance of a business object. The method 'UPDATE' may serve to update one or more data values of an already instantiated business object stored in database 118. The method 'DELETE' of buffer object 132 may serve to delete an instantiated business object that may be stored in database 118. The method 'SELECT' may serve to access an instantiated business object stored in database 118 by means of its access key. The method 'SELECT_BY_RELATION' may serve to access an instantiated business object using one of its relations.

The above-described methods may be performed with respect to nodes of a business object. Each business object may be described by an entity relationship model consisting of several nodes and their relations. Core services like 'UPDATE', 'DELETE', and 'INSERT' may be working only on a business object's nodes and not on the business object as a whole.

The methods 'INSERT', 'UPDATE', and 'DELETE' may not be directly performed on database 118, but on respective data that may be temporarily stored in main memory. Inserted or updated data may be persistently written to database 118 by the method 'SAVE' of buffer object 132.

For example, in operation, service consumer 104 may send service request 134 to enterprise services framework interface 102. Service request 134 may relate to one of business objects BO1, BO2, BO3 stored in enterprise services repository 122. In response to service request 134, enterprise services framework interface 102 may perform an access operation to repository 130 in order to create an instance of buffer object 132. The respective buffer object instance 136 may be stored in main memory 110.

Further, an instance of the business object to which service request 134 relates may also be created as an integral part of buffer object instance 136. In other words, buffer object instance 136 created in response to service request 134 may carry a business object instance 138 of the business object to which service request 134 relates.

After creation of buffer object instance 136, there can be an exchange of data and/or commands between buffer object instance 136 and service consumer 104 in order to perform a transaction. For performance of the transaction, various database access methods provided by buffer object instance 136 can be called by the service consumer.

Transactional data may be held in buffer object instance 136, for example, in main memory 110, during performance of the transaction. Before persistently storing resultant transactional data in database 118 by buffer object instance 136 by means of its method 'SAVE', buffer object instance 136 may call the application program assigned to business object instance 138. In the example considered here, this may be application program A.

Application program A may check the transactional data for completeness, plausibility, and/or consistency. Further, it can enrich the transactional data by adding additional information to the transactional data. Application program A may respond to buffer object instance 136 by accepting or declining the transactional data. If application program A has accepted the transactional data, the transactional data may be persistently saved in database 118. If application program A has declined the transactional data, an error message may be generated.

Application programs A, B, do not need to include methods for accessing database 118. Rather, all database access methods may be implemented in buffer object instance 136 in a consistent way that may be uniform for all service requests and for all application programs. This may avoid a need to program database access methods for each of the application programs. This facilitates the programming of application programs as application programs may include the business logic but do not need to include the technical infrastructure for performing database access operations. As all such database access methods may be provided in a uniform way by buffer object 132, database access latency times may be identical, which facilitates interoperation of the elements of the enterprise services framework.

Figure 2:
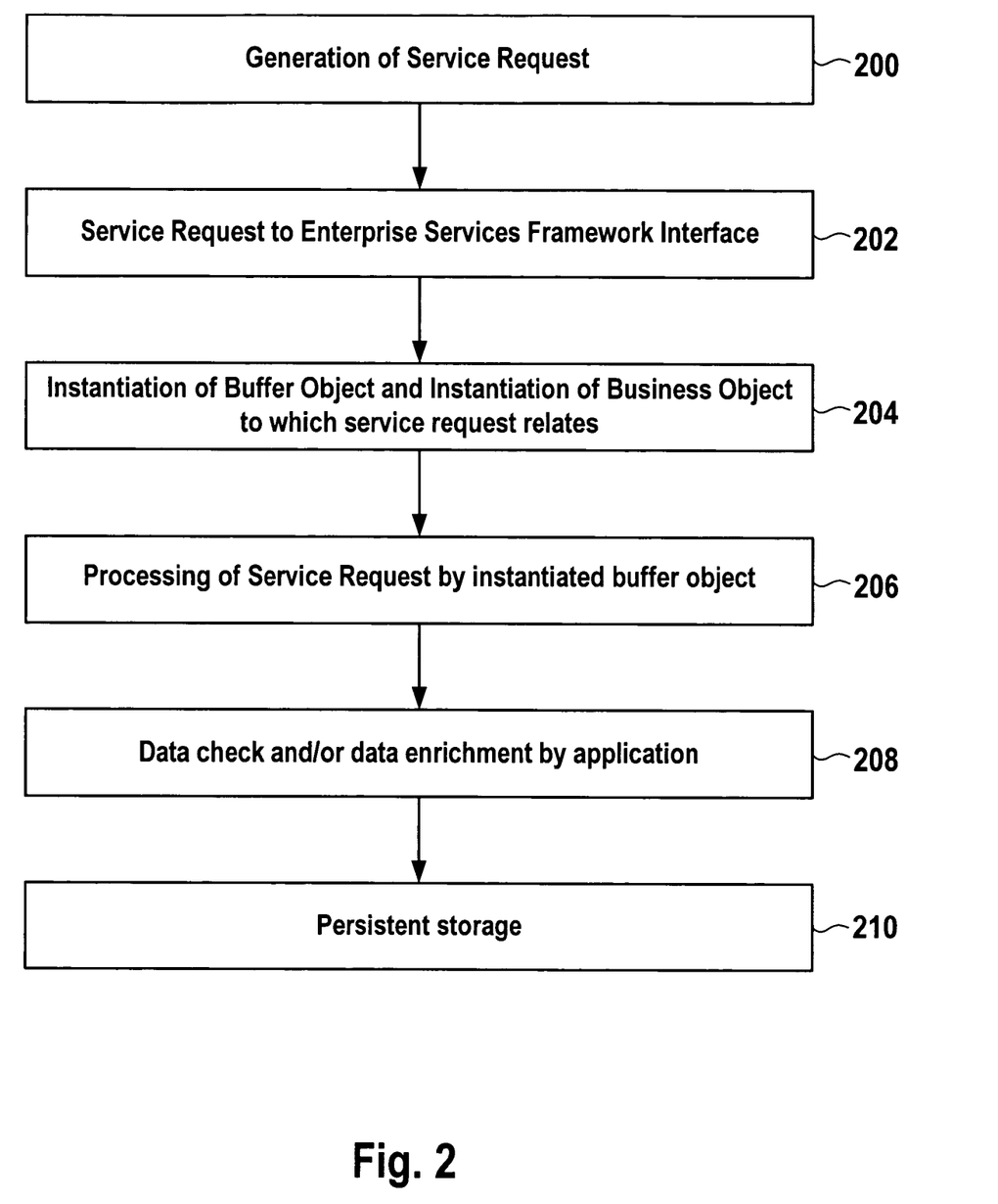
FIG. 2 is a flowchart, consistent with an embodiment of the invention, of an exemplary method for accessing data.

FIG. 2 illustrates an exemplary method, consistent with an embodiment of the invention. In step 200, a service request may be generated by one of the service consumers coupled to the enterprise services framework. The services request may be sent to the enterprise services framework interface in step 202. In response, the buffer object that contains the database access methods may be instantiated, as well as the business object to which the service request relates, at step 204. The instantiated buffer object may carry the instantiated business object as an integral part. Both the instantiated buffer object and its instantiated business object may be held in main memory.

Depending on the kind of service request, more than one business object may be instantiated. Transactional data may be received together with the service request and stored as part of the instantiated buffer object in main memory (step 204).

In step 206, the service request may be processed by the instantiated buffer object. In other words, the requested transaction may be performed. Resultant transactional data may be persistently stored in the database. Before such a persistent storage can occur, the data may be checked by the application program identified by the instantiated business object (step 208).

For example, the application program may check the data for completeness, plausibility, and/or consistency. Further, as part of step 208, the application program may perform one or more data processing steps for data enrichment, i.e., for adding of additional information to the transactional data.

The application program may respond with an acceptance message accepting the transactional data or by a message that indicates that the application program has declined storage of the transactional data in the database. If information has been added to the transactional data by the application program, the additional data may also be transmitted back to the instantiated buffer object.

If the buffer object receives an acceptance message from the application program, the transactional data may be stored from main memory to the database in step 210.

Figure 3:
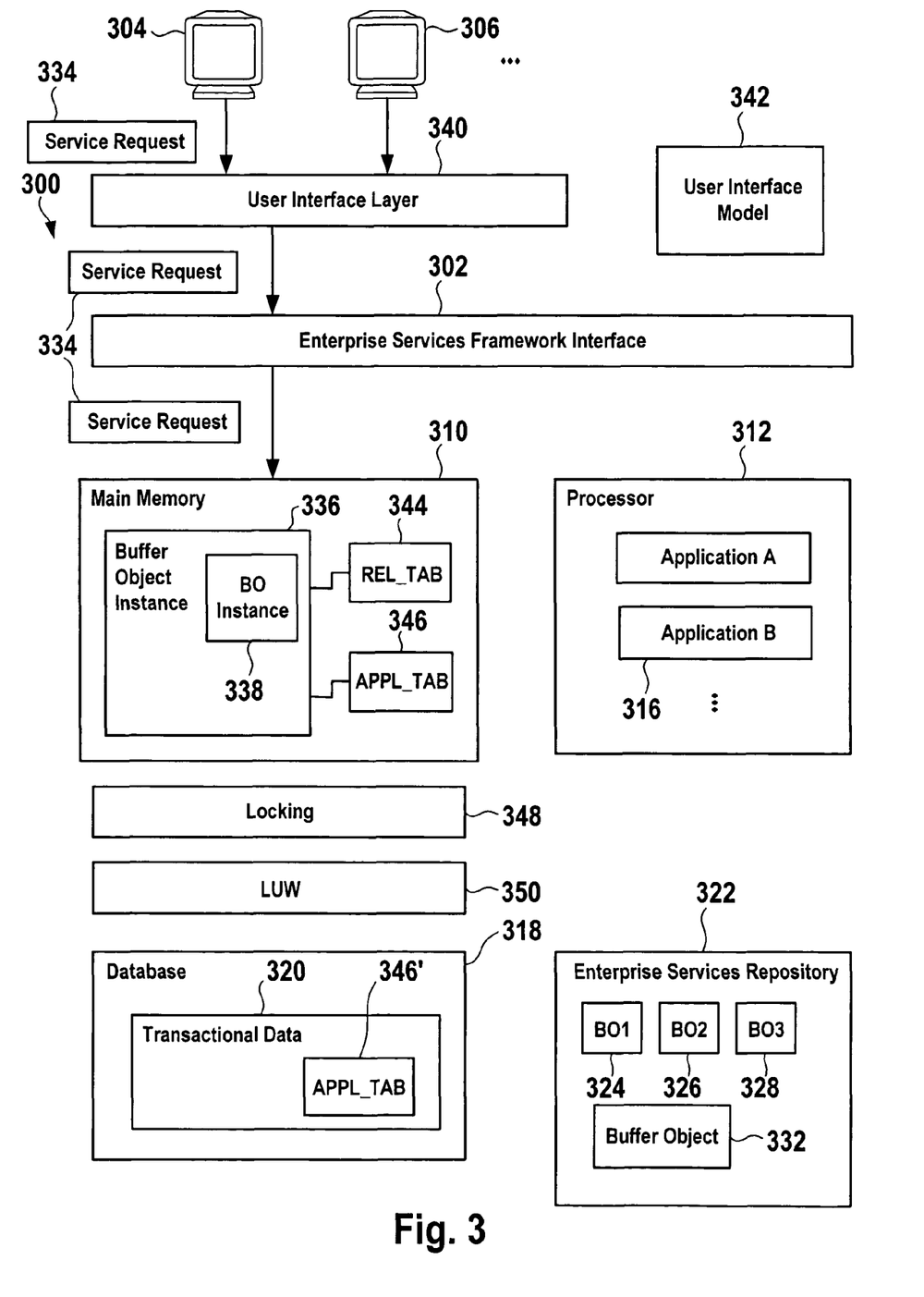
FIG. 3 is a block diagram, consistent with an embodiment of the invention, of another exemplary data processing system.

FIG. 3 illustrates another exemplary data processing system 300 consistent with an embodiment of the invention. This exemplary system 300 may be used to implement, for example, an enterprise services framework, such as an ESI. Further, in the embodiment of FIG. 3, the service consumers may be personal computers 304, 306.

The enterprise services framework implemented by data processing system 300 may comprise user interface layer 340 and user interface model 342. User interface model 342 may comprise a user interface pattern that may be parameterized by user interface layer 340 when a service request 334 is received from one of the computers, such as personal computer 304.

Buffer object instance 336 may incorporate relations table 344 and application or transactional data table 346. Relations table 344 and transactional data table 346 may be held in main memory 310. Relations table 344 may serve for storage of relationship information of business object instance 338 and transactional data table 346 may serve for storage of transactional data of business object instance 338.

After completion of the transaction, the transactional data stored in transactional data table 346 may be stored in the respective transactional data table 346' within database 318, provided that the data check performed by the respective application program resulted in an approval of the database access operation for storage of the transactional data.

Relations table 344 may serve as a cache memory during performance of the transaction in order to avoid duplicate database access operations for reading relations data of the instantiated business object from database 318. The complete relations data may be read or only those data items that are required for performing the transaction may be read.

Locking module 348 may protect transactional data 320 stored in database 318 if multiple database access operations are requested simultaneously. For example, multiple buffer object instances 336 may be created due to multiple service requests 334 that have been received from various service consumers. These buffer object instances 336 may attempt to perform data save operations for saving transactional data in database 318 simultaneously. Locking module 348 may assure that writing transactional data by one buffer object instance may be prevented if the data is being read by another buffer object instance. Locking module 348 may also restrict transactional data from being read from database 318 that has already been loaded for use in a transaction by another buffer object instance.

Further, data processing system 300 may comprise logical unit of work (LUW) module 350. When a logical unit of work, e.g., a transaction, has been completed, LUW module 350 may ensure that the respective transactional data may be stored in database 318 in accordance with the applicable database procedures.

In operation, user interface layer 340 may receive a service request 334 from one of the personal computers, e.g., from personal computer 304. Service request 334 may be forwarded to enterprise services framework interface 302. In response, buffer object instance 336 may be created by reading meta information of buffer object 332 from the enterprise services repository. In contrast to the exemplary embodiment considered with respect to FIG. 1, buffer object 332 may be stored together with the business objects in enterprise services repository 322. As in the embodiment of FIG. 1, private meta data that is descriptive of only buffer internals may be separated from public meta data available for all consumers.

Further, business object instance 338 may be created and integrated into buffer object instance 336. Relations table 344 may be filled with relation information of business object instance 338 by reading required relations information from database 318. Likewise, it can be required to read transactional data 320 of business object instance 338 from database 318 in order to perform the requested transaction. Before transactional data may be written into transactional data table 346 by the respective service consumer, such as by means of service request 334, one of the application programs identified by business object instance 338 may be called in order to check the data for consistency.

After completion of the transaction, the resultant transactional data stored in transactional data table 346 may be checked again by the application program identified by business object instance 338. If the data check is successful, the transactional data may be written from transactional data table 346 into database 318, i.e., into transactional data table 346, by means of the save method of buffer object instance 336 using locking module 348 and LUW module 350.

A buffer object may be implemented as follows: for each business object there may be one transaction handler, one locking manager, and a number of N business object node buffers for a business object with N nodes. The transaction handler, the locking manager, and the N business object node buffers constitute the instantiated buffer object for that business object. There may be a number of N tables 346 (APPL_TAB) that serve as buffers for the N business object nodes.

For another business object the same ABAP objects may be used, but parameterized in another way. Meta data may be used to personalize the buffer object for one or more different business object class.

Figure 4:
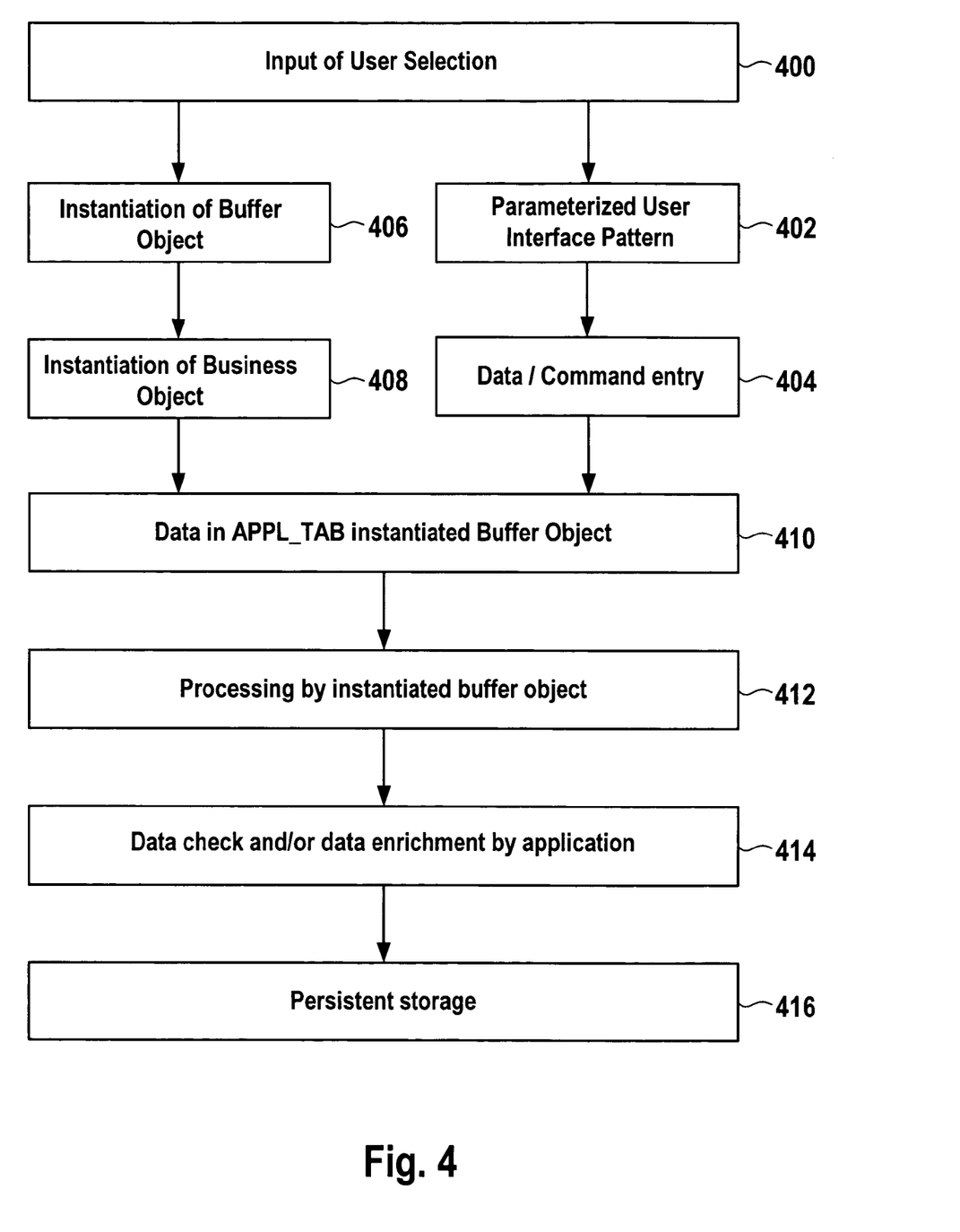
FIG. 4 is flow diagram, consistent with an embodiment of the invention, of another exemplary method for accessing data.

FIG. 4 shows a flowchart, consistent with an embodiment of the invention, of another exemplary method. In step 400, a user may input a selection of a business transaction to be performed. In response, a respective user interface pattern may be parameterized in step 402, such that a user dialogue for data and/or command entry can be performed (step 404). In parallel, the buffer object may be instantiated (step 406) in response to the user selection performed in step 400. In step 408, the business object that corresponds to the requested transaction may be instantiated as an integral part of the instantiated buffer object. The requested transaction may involve two or more business objects; in this instance, the required business objects may be instantiated in step 408 as an integral part of the instantiated buffer object.

In step 410, transactional data that has been read from the database or received from the user may be stored in the transactional data table of the instantiated buffer object. The transactional data may be processed by the instantiated buffer object in step 412 until completion of the requested transaction. In step 414, the resultant transactional data may be checked by the application program identified by the instantiated business object. In addition, the application program can add information to the transactional data to enrich the data. If the data check performed by the application program in step 414 has been successful, the transactional data may be persistently stored in the database in step 416.

Figure 5:
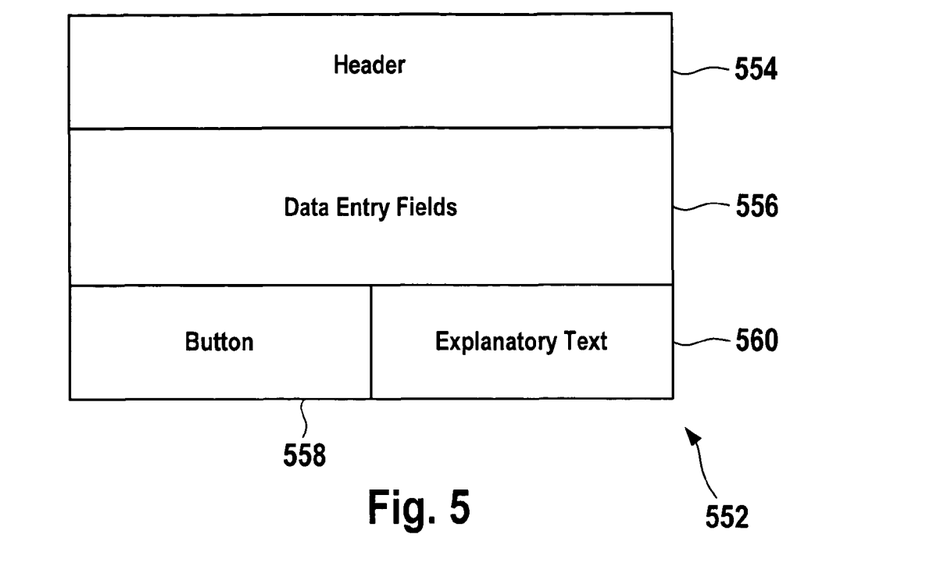
FIG. 5 schematically shows an embodiment consistent with the invention of an exemplary user interface pattern.

FIG. 5 illustrates an exemplary user interface pattern 552, consistent with an embodiment of the invention. User interface pattern 552 may comprise header portion 554, data entry portion 556, control button portion 558, and explanatory text portion 560. User interface pattern 552 may be parameterized for performing various transactions.

Figure 6:
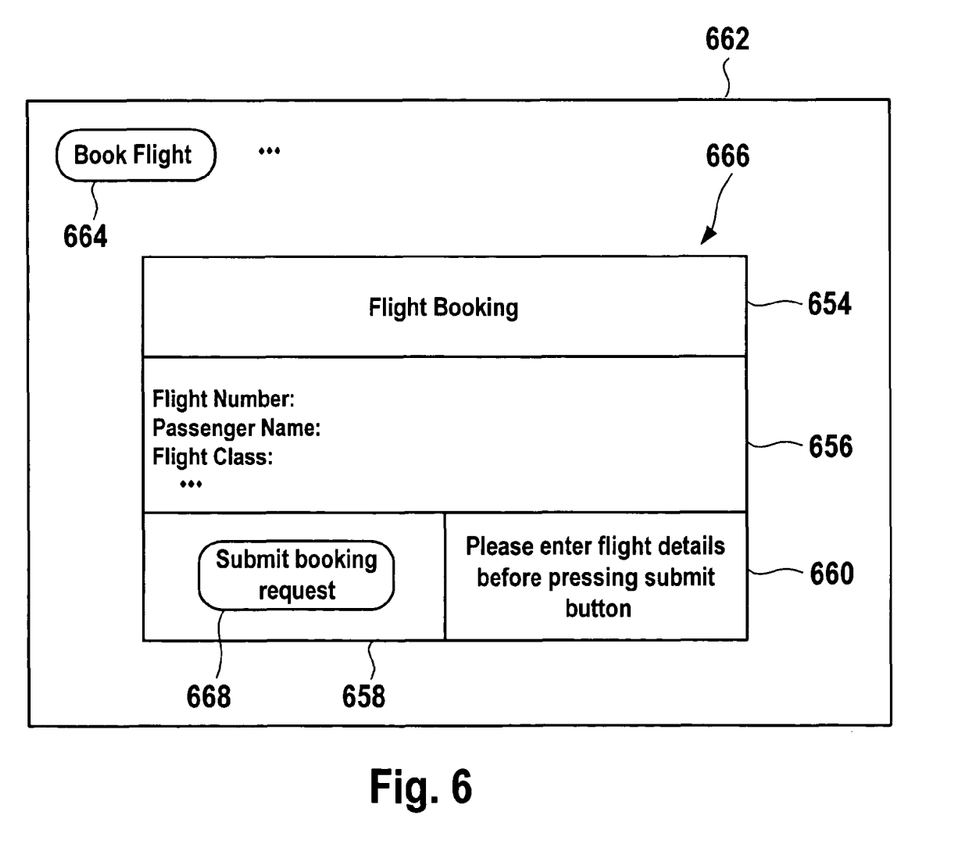
FIG. 6 illustrates, consistent with an embodiment of the invention, an exemplary user interface pattern of FIG. 5 after parameterization for a business object for booking a flight.

FIG. 6 illustrates an example for booking a flight, consistent with an embodiment of the invention. Computer monitor 662 may display button 664 for requesting the booking of a flight. Various other buttons for requesting various other transactions may also be displayed on computer monitor 662.

If the user selects button 664, such as by a double click, user interface pattern 552 (cf. FIG. 5) may be parameterized for flight booking. Resultant window 666 may then be displayed on computer monitor 662. Window 666 may comprise a header 654 that indicates the type of the transaction, i.e., 'flight booking', a data entry portion 656 for entering transactional data such as the flight number, passenger name, flight class, etc., a control button portion 658 that may comprise a control button 668 for calling a method of the respective instantiated buffer object, and an explanatory text portion 660 that explains usage of window 660, e.g., 'please enter flight details before pressing submit button'.

Control button portion 658 may comprise more than one control button for calling various methods of the instantiated buffer object.

In operation, for example, the user may double click on button 664 in order to start the transaction for booking a flight. In response, window 666 may be displayed, which enables the user to enter the flight details into data entry portion 656.

For example, the user may be required to press 'enter' after entry of each data item in data entry portion 656. Pressing the enter button may cause a method call of the instantiated business object in order to have the respective application program check the entered data. For example, after entry of the flight number, the instantiated buffer object may call the respective application program in order to check the flight number for correctness.

After all compulsory data fields within data entry portion 656 have been completed, the user may click on control button 668 in order to submit the booking request. In response, the instantiated buffer object may call the respective application program in order to check the transactional data entered into data entry portion 656. If the data check is successful, the instantiated buffer object may persistently store the transactional data into the database.

Other embodiments of the invention will be apparent to those skilled in the art from consideration of the specification and practice of embodiments and features of the invention disclosed herein. It is intended, therefore, that the specification and embodiments be considered as exemplary only, with a true scope and spirit of the invention being indicated by the following claims.

What is claimed is:

1. A data processing system, comprising:
an enterprise services framework interface adapted to receive a service request from a service consumer;
a database storing transactional data;
a repository storing public metadata descriptive of business objects and for storing private metadata descriptive of a buffer object, wherein the public metadata is public to the service consumer and the private metadata is private to an enterprise services provider;
a processor executing an application program; and
a main memory storing an instance of the buffer object, the instance of the buffer object containing the private metadata and at least one instance of one of the business objects, methods for accessing the database using the application program, or methods for calling the application program,
wherein:
the at least one instance of one of the business objects describes an elementary business process and carries public metadata, the public metadata directly identifying an application program as being called by the at least one instance of one of the business objects in response to the service request;

the application program identified by the public metadata carried by the business objects checks transactional data requested by the service consumer and determines whether or not the transactional data is accepted or declined; and in the case that the transactional data requested by the service consumer is accepted by the application program, the buffer object receives an acceptance message from the application program and allows the transactional data to be stored in the database.

2. The data processing system of claim 1, wherein the instance of the buffer object is adapted to hold transactional data before persistent storage thereof in the database.

3. The data processing system of claim 1, wherein the repository comprises an enterprise services framework repository for storing the public metadata descriptive of the business object and a repository for storing private metadata descriptive of the buffer object.

4. The data processing system of claim 1, further comprising a user interface layer comprising a user interface pattern, wherein the user interface layer is adapted to parameterize the user interface pattern for generating a window for a user's entry of the service request.

5. The data processing system claim 1, wherein the buffer object comprises database methods for:
   inserting a newly created instance of one of the business objects;
   updating a previously created instance of one of the business objects;
   deleting a previously created instance of one of the business objects;
   selecting a previously created instance of one of the business objects by means of a respective access key;
   adding a node to a previously created instance of one of the business objects; and
   saving business object related data being held in the buffer object into the database.

6. The data processing system of claim 5, wherein at least one of the database methods are executable on nodes of the business objects.

7. The data processing system of claim 1, further comprising a locking component for maintaining data consistency when concurrent database access operations occur.

8. The data processing system of claim 1, wherein the instantiated buffer object is adapted to initiate a database update using a database logical unit of work module.

9. The data processing system of claim 1 wherein a business object carrying the public metadata that directly identifies the application program identifies the application program by encapsulating a description of a complete business process in the business object.

10. The data processing system of claim 1 wherein the buffer object that contains private metadata is adapted to hold transactional data before persistent storage thereof in the database.

11. The data processing system of claim 1 wherein public metadata that directly identifies the application program identifies the application program by directly instantiating the application program identified by the public metadata.

12. A data processing method for accessing a database in an enterprise services framework, comprising:

receiving a request from a service consumer for performing a database access operation via an enterprise services framework interface;

instantiating a buffer object containing private metadata, the instantiated buffer object comprising at least one instantiated business object, methods for accessing a database using the application program and storing transactional data, or methods for calling an application program, wherein the public metadata is public to the service consumer and private metadata is private to an enterprise services provider, wherein the at least one instantiated business object describes an elementary business process and carries public metadata, the public metadata directly identifying an application program as being called by the at least one instantiated business object in response to a service request;

temporarily storing transactional data related to the request as part of the instantiated buffer object in a main memory;

calling the application program identified by the at least one business object with the instantiated buffer object for checking the transactional data related to the request from the service consumer and determining whether or not the transactional data is accepted or declined; and persistently storing the transactional data in the database in the case that the application program has determined that the transactional data related to the request from the service consumer is accepted, and an acceptance message from the application program has been received by the buffer object.

13. The data processing method of claim 12, further comprising parameterizing a user interface pattern by a user interface layer for generating a window for a user's entry of the service request.

14. The data processing method of claim 12, wherein the database access is performed using at least one of the following methods of the instantiated buffer object:
   inserting a newly created instance of one of the business object nodes;
   updating a previously created instance of one of the business object nodes;
   deleting a previously created instance of one of the business object nodes;
   selecting a previously created instance of one of the business object nodes by means of a respective access key;
   adding a node to a previously created instance of one of the business objects; and
   saving business object related data being held in the buffer object into the database.

15. The data processing method of claim 12, further comprising database locking for maintaining data consistency when concurrent database access operations occur using a locking component.

16. The data processing method of claim 12, further comprising initiating a database update by means of a database logical unit of a work module.

17. The data processing system of claim 12 wherein public metadata that directly identifies the application program identifies the application program by directly instantiating the application program identified by the public metadata in the front end enterprise services framework interface.

18. A computer memory comprising program code instructions which, when executed in a processor, perform a method for processing data, the method comprising:

receiving a request from a service consumer for performing a database access operation via an enterprise services framework interface;

instantiating a buffer object containing private metadata, the instantiated buffer object comprising at least one instantiated business object, methods for accessing a database using the application program and storing transactional data, or methods for calling an application program, wherein the public metadata is public to the service consumer and private metadata is private to an enterprise services provider;

wherein the at least one instantiated business object describes an elementary business process and carries public metadata, the public metadata directly identifying an application program as being called by the at least one instantiated business object in response to a service request;

temporarily storing transactional data related to the request as part of the instantiated buffer object in a main memory;

calling the application program identified by the at least one business object with the instantiated buffer object for checking the transactional data related to the request from the service consumer and determining whether or not the transactional data is accepted or declined; and persistently storing the transactional data in the database in the case that the application program has determined that the transactional data related to the request from the service consumer is accepted, and an acceptance message from the application program has been received by the buffer object.

19. The data processing system of claim 18 wherein public metadata that directly identifies the application program identifies the application program by directly instantiating the application program identified by the public metadata in the front end enterprise services framework interface.

\* \* \* \* \*